United States Patent
Lee et al.

(10) Patent No.: US 6,700,931 B1
(45) Date of Patent: Mar. 2, 2004

(54) METHOD, SYSTEM AND APPARATUS FOR INITIATING AND MAINTAINING SYNCHRONIZATION OF A PULSE POSITION MODULATION (PPM) DECODER WITH A RECEIVED PPM SIGNAL

(75) Inventors: Youbok Lee, Chandler, AZ (US); Lee Furey, Phoenix, AZ (US); Sam Alexander, Phoenix, AZ (US); William F. Gallagher, Phoenixville, PA (US); Ron Salesky, Tabernacle, NJ (US); Shinichiro Inui, Haddonfield, NJ (US)

(73) Assignee: Microchip Technology Incorporated, Chandler, AZ (US)

( * ) Notice: Subject to any disclaimer, the term of this patent is extended or adjusted under 35 U.S.C. 154(b) by 598 days.

(21) Appl. No.: 09/611,104

(22) Filed: Jul. 6, 2000

(51) Int. Cl.[7] .............................. H03K 7/06; H03K 9/04; H03K 9/06
(52) U.S. Cl. ............. 375/239; 375/240.02; 375/240.28; 329/313
(58) Field of Search ........................... 375/239, 240.02, 375/240.28; 329/313

(56) References Cited

U.S. PATENT DOCUMENTS

| | | | |
|---|---|---|---|
| 5,522,866 A | 6/1996 | Fernald | 607/60 |
| 5,583,819 A | 12/1996 | Roesner et al. | 365/225.7 |
| 6,066,982 A * | 5/2000 | Ohtani | 329/313 |
| 6,434,194 B1 * | 8/2002 | Eisenberg et al. | 375/238 |
| 6,442,200 B1 * | 8/2002 | Fukui | 375/239 |

OTHER PUBLICATIONS

Lee et al, alm Trellis–Coded Pulse–Position Modulation for Indoor Wireless Infrared Communications, IEEE, Transaction on Communications, vol. 45, No. 9 Sep. 1997.*
PCT Search Report PCT/US 01/21224, Mailed Dec. 14, 2001.
Lee Y. et al.; "The Advantages of Asynchronous Versus Synchronous Circuit Designs for Use in Passive RFID Applications" Proceedings of the European Conference on Circuit Theory and Design. ECCTD'99, Stresa, Italy, pp. 41–44, vol. 1. XP001050300, 1999.

* cited by examiner

Primary Examiner—Don N. Vo
Assistant Examiner—Qutbuddin Ghulamali
(74) Attorney, Agent, or Firm—Baker Botts L.L.P.

(57) ABSTRACT

A radio frequency identification (RFID) tag device having a pulse position modulation (PPM) decoder circuit which calculates a relative frequency relationship between an internal clock-oscillator of the RFID tag device and an external PPM source such as a RFID tag reader, and then synchronizes the RFID tag device PPM decoder circuit to the required precision for reliable PPM symbol decoding. The PPM decoder is synchronized by measuring the "counts per pulse" (CPP) from a calibration cycle having a plurality of pulses in a single symbol frame.

23 Claims, 5 Drawing Sheets

METHOD, SYSTEM AND APPARATUS FOR INITIATING AND MAINTAINING SYNCHRONIZATION OF A PULSE POSITION MODULATION (PPM) DECODER WITH A RECEIVED PPM SIGNAL

FIELD OF THE INVENTION

This invention relates generally to radio frequency identification (RFID) tag devices, and more particularly, to a read and write radio frequency identification tag device which synchronizes its decoder timing to the pulse positions of a received pulse position modulation (PPM) signal.

BACKGROUND OF THE RELATED TECHNOLOGY

A radio frequency identification (RFID) tag is a device that stores identification information and sends back this identification information, and may also include other information, when the device is powered-up by a radio frequency (RF) signal. These RFID tag devices may be used in managing inventory, automatic identification of cars on toll roads, security systems, electronic access cards, keyless entry and the like. RFID tag devices utilize radio frequencies that have much better penetration characteristics to material then do optical signals, and will work under more hostile environmental conditions then bar code labels. Therefore, the RFID tag device may be read through paint, water, dirt, dust, human bodies, concrete, or through the tagged item itself. RFID tag devices are used in conjunction with a radio frequency tag reader (interrogator) which transmits RF signals and receives data signals from the RFID tag device. The passive RFID tag device has no internal power source, rather it uses the incoming RF signal as a power source. Once the RFID tag device is activated, it sends stored data to the interrogator by modulating the amplitude of the incoming RF signal.

There are two classes of passive RFID tag devices: (1) read only, and (2) read and write (or read/write). In the read only RFID tag device, information stored in a memory array is not rewriteable once it has been written and locked. This RFID tag device normally sends the stored information as soon as it is energized by the RF signal from the interrogator. In the read/write RFID tag device, the information stored in the memory array is rewriteable at any time by an RF command sequence from the interrogator. Thus, the information in the memory array can be constantly updated and then read by the interrogator.

The RFID tag device transmits stored information to the reader-interrogator by modulating the amplitude of the RF carrier signal from the reader by detuning a resonant circuit of the RFID tag device that is initially tuned to the RF carrier signal (de-Qing or loading, for example by resistive loading, of the resonant circuit in the RFID tag device may also be used to modulate the amplitude of the RF carrier signal of the reader-interrogator). The RFID tag device comprises, for example, a parallel connected inductor and capacitor which is used as an antenna and is resonant (tuned) to the frequency of the RF carrier signal of the interrogator, an RF to direct current (DC) converter, a modulation circuit to send the stored information to the reader-interrogator, a logic circuit which stores coded information, a memory array that stores digitized information, and controller logic that controls the overall functionality of the RFID tag device.

An excellent application for RFID tag devices is item level tagging such as retail and inventory management where a large number of RFID tags may be read and written in a short period of time. Using read-write RFID tag devices, product information stored in the RFID tag device memory array such as inventory number, product expiration date, weight, and product description can be constantly updated.

Unlike the read-only RFID tag device, the read-write RFID tag device needs a specific command sequence for writing to or reading from its memory array. Therefore, the read-write RFID tag device may have, for example, two operational modes: 1) "tag talks first" and 2) "reader talks first" modes. The "tag talks first" mode is when the RFID tag device transmits its data as soon as it is energized by the RFID tag reader. The "reader talks first" mode is when the RFID tag device does not transmit data unless being commanded to do so by the RFID tag reader.

The RFID tag reader sends command signals to the RFID tag device by modulating its RF carrier signal. These command signals may be represented by appropriately timed gap pulses using, for example, pulse position odulation (PPM) of the RF carrier signal. PPM is a transmission scheme whereby data is represented by the temporal location of a pulse or pulses within a time window known as a symbol frame. Initiating and maintaining synchronization of the RFID tag device's time reference to the PPM signals from the RF)D tag reader is of the utmost importance for correct communications between the RFID tag device and reader.

There are two ways to achieve synchronization: The first uses the radio frequency carrier as a reference. This is often called the "synchronous" method. In this method, the internal power consumption of the RFID tag device increases as the carrier frequency goes higher. Therefore, this may reduce the total available power for reradiation. As a result, the effective communications range between the RFID tag device and reader becomes shorter.

The second way is to generate an internal reference signal by an internal oscillator in the RFID tag device. This is called the "asynchronous" method. This method, however, requires "calibration" of the internal timing reference of the RFID tag device to the reader's timing signal. This "time calibration" can be achieved by transmitting a calibration pulse from the reader every so often. This calibration pulse must be transmitted ahead of the PPM command signal so that the internal timing of the RFID tag device is synchronized to the reader before the PPM command is detected. Since the internal oscillator of the RFID tag device can be designed to keep the power consumption low, the total power consumption of the device can be less than a device using the synchronous method. As a result, its communication range becomes greater. This is an advantage of an RFID tag device using the asynchronous method.

Therefore, what is needed is a simple and effective way of synchronizing a PPM decoder circuit and externally transmitted PPM signal to a required timing precision for correct PPM decoding.

SUMMARY OF THE INVENTION

The invention overcomes the above-identified problems as well as other shortcomings and deficiencies of existing technologies by providing in an RFID tag device having a PPM decoder that is synchronized to an external PPM source such as a RFID tag reader by measuring the number of internal oscillator cycles during a calibration cycle having a plurality of pulses in a single symbol frame.

The RFID tag reader sends the command and acknowledgment signals to the RFID tag device by modulating the continuous wave (CW) carrier signal. The RFID tag reader uses, for example, a 1-of-16 PPM for data transmission. The gap pulse sequences are controlled by the time spacing between pulses to encode the command and operating parameters. The RFID tag reader also sends time reference pulses to calibrate the time base of the decoder in the RFID tag device. The time spacing between pulses for both the 1 of 16 PPM data and the calibration reference can be measured by counting the number of oscillator frequency cycles elapsing from an internal on-chip oscillator of the RFID tag device.

The RFID tag reader uses 1 of 16 PPM for control commands such as tag acknowledgment, read a tag block, write a tag block, etc. The 1 of 16 PPM uses the pulse positions in one of sixteen possible time slots as the communication mechanism for sending 4 bit symbols ($2^4$=16). All communications begin with a code violating calibration sequence composed of, for example but not limited to, three pulses in pulse positions zero, six and fourteen.

The symbol frame start and end are not explicitly transmitted and may be recovered by knowledge of the last symbol received, the count to the next received pulse and counts per pulse width. An equation describing this relationship is:

$$(sym)_n = CBP/CPP - 16 + (sym)_{n-1}$$

where CBP=number of internal oscillator counts between pulses

CPP=number of internal oscillator counts per pulse width $(sym)_{n-1}$=previous received symbol $(sym)_n$=new symbol received Initiating synchronization is achieved by recognizing the code violating calibration cycle and determining the "counts per pulse width" (CPP) of the internal oscillator of the RFID tag device. Maintaining synchronization requires the ability to use the new pulse to correct for any accumulated error between the RFID tag device and the transmitted PPM time bases, and to maintain the time base of the RFID tag device time base to sufficient accuracy between the PPM pulses. For a maximum pulse separation of 31 pulse positions, the maximum allowed error is preferably ½ pulse position. This allows a maximum error of one part in 62, or +/−1.6%.

Timing for detecting (demodulating) these commands from the PPM radio frequency (RF) or electromagnetic transmission is generated by a clock-oscillator internal to the RFID tag device. Communication between the RFID tag reader and RFID tag device takes place asynchronously with respect to the internal oscillator of the RFID tag device. To enhance the detection accuracy in the RFID tag device, the RFID tag reader may send three specifically timed reference pulses followed by the command and programming data signals. The RFID tag device uses the calibration timing pulses to calibrate its timing reference in the PPM decoder. The RFID tag reader transmits the timing pulses at the start of the command sequence. Time periods between the timing pulses may be used to calibrate the RFID tag device's timing for proper PPM decoding. According to the present invention, the RFID tag device measures the time periods between the demodulated time reference pulses, and uses these time periods to calibrate its internal PPM decoder circuit and thus determine the CPP.

The PPM decoder of the RFID tag device may be implemented as a state machine. The PPM decoder state machine uses a bit window counter to track the state of the received PPM transmission. On RFID tag device power up, its PPM decoder state machine expects the transmission of a code violating calibration symbol. The format of the calibration symbol generally comprises three modulation pulses at time slots zero, six and fourteen of sixteen possible time slots in a code symbol. Other number of modulation pulses and time slots for a calibration symbol may be used and are contemplated herein.

While the PPM decoder is in its initial state, the bit window counter is reset to $0_{16}$ and kept there until the detection of the first modulation pulse. Once the first modulation pulse of the calibration symbol has been received, a bit down counter is loaded with a reload value and is allowed to count down at the rate of the internal clock. When the bit down counter underflows, the bit window counter is incremented by one and the bit down counter is reloaded with the contents of a reload register. At each underflow of the bit down counter, the bit window counter is incremented by one and the bit down counter is reloaded.

Upon reception of the next modulation pulse, if the bit window counter is in a desired range, the bit down counter is reloaded with the reload value. Operation of the invention proceeds as before with the bit down counter causing the bit window counter to increment on each underflow and the bit down counter being reloaded with the contents of the reload register. During this period the calibration controller will start the calibration counter based on the value stored in the calibration code register, the bit down counter and the bit window counter. If a third modulation pulse occurs within the bit window range of $C_{16}$ to $F_{16}$ then it is assumed that this is the calibration symbol. The bit window counter is reset to $E_{16}$, the bit down counter is reloaded with $5_{16}$, and the calibration code register is loaded with the current value of the calibration counter.

PPM symbol reception begins once the bit window counter rolls over to $0_{16}$. PPM uses the bit position within the symbol frame to represent data. The bit window counter is used to decode this symbol value. On every modulation pulse, the bit down counter is loaded with a reload value which is approximately the midpoint of every window for all allowed values found in the calibration code register. At any time, a calibration symbol may occur as long as it is properly framed within a symbol time period. A calibration controller starts the calibration counter based on the current calibration code, bit window counter and bit down counter. If the current calibration code is correct, then the reception of the $3^{rd}$ bit of the calibration symbol will occur when the values in the bit window counter equals $E_{16}$ and the bit down counter equals the reload value, respectively. Under these conditions the value in the calibration counter will always equal the value in the calibration code register.

In an embodiment of the present invention, the bit window counter comprises a modulo-16 counter, and the bit down counter comprises a CPP/2 carry flip-flop and a modulo-CPP/2 counter. The modulo-CPP/2 counter counts off two half periods of each PPM pulse position. At each half period, a carry output from the modulo-CPP/2 counter causes the CPP/2 carry flip-flop (D-flipflop) to toggle. The rising edge of the not-Q output of the CPP/2 carry flip-flop then clocks the modulo-16 counter (bit window counter) that tracks the pulse position count. Note that the modulo-16 counter may be reset to $E_{16}$ by the last pulse of the calibration symbol.

It is contemplated and within the scope of the present invention that the embodiment of the invention may also be utilized with systems using pulse code modulation (PCM), pulse number modulation (PNM), pulse width modulation (PWM), etc.

The foregoing and other features and advantages of the invention will be apparent from the following, more particular, description of the preferred embodiments of the invention, as illustrated in the accompanying drawings.

DETAILED DESCRIPTION OF THE PREFERRED EMBODIMENT

The present invention is an RFID tag device comprising a circuit that calculates the relative frequency relationship between an internal oscillator of the RFID tag device and an external PPM source such as a RFID tag reader, and then synchronizes the RFID tag device PPM decoder circuit to the required precision for reliable PPM symbol decoding. In the embodiment of the present invention, the PPM decoder is synchronized by measuring the "counts per pulse" (CPP) from a calibration cycle having a plurality of pulses in a single symbol frame. It is contemplated and within the scope of the present invention that the following embodiment of the invention may also be utilized with systems using pulse code modulation (PCM), pulse number modulation (PNM), pulse width modulation (PWM), etc.

Referring now to the drawings, the details of the preferred embodiment of the invention are schematically illustrated. Elements in the drawings that are the same will be represented by the same numbers and/or letters, and similar elements will be represented by the same numbers and/or letters with a different lower case letter suffix.

Figure 1:
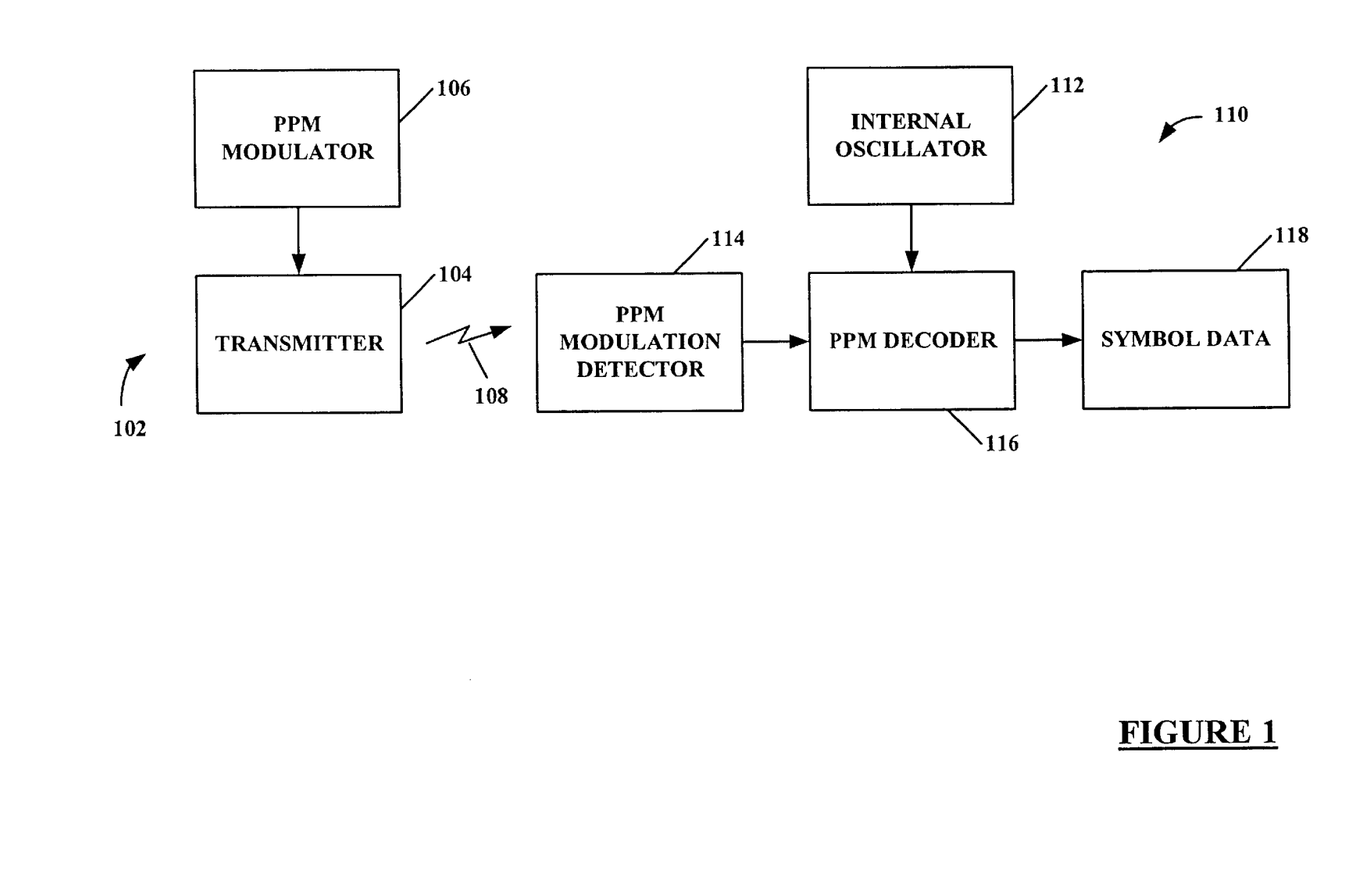
FIG. 1 is a schematic block diagram of an asynchronous pulse position modulation (PPM) RFID tag system.

Referring to FIG. 1, a schematic block diagram of an RFID tag system is illustrated. A transmitter—PPM modulator portion of an RFID tag reader is indicated generally by the numeral 102 and comprises a transmitter 104 and a PPM modulator 106 for modulating the radio frequency (RF) or electromagnetic transmission 108 from the transmitter 104. A receiver-decoder portion of an RFID tag device is indicated generally by the numeral 110 and comprises a PPM modulation detector 114, an internal oscillator 112, a PPM decoder 116, and symbol data 118. It is contemplated and within the scope of the present invention that the RFID tag device 110 may be fabricated on a single semiconductor integrated circuit die (not illustrated) and produced in a number of different integrated circuit packages (not illustrated).

Figure 1A:
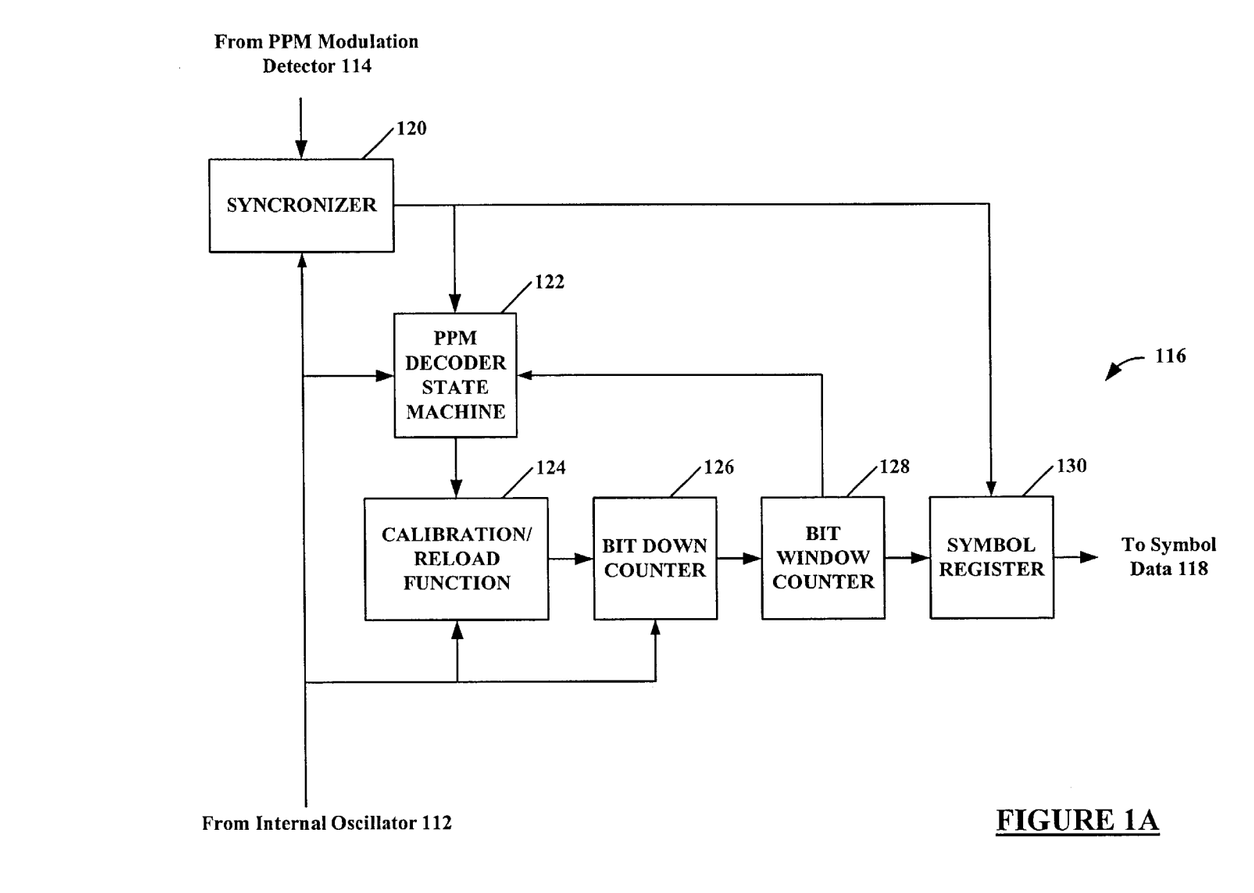
FIG. 1A is a more detailed schematic block diagram of a PPM decoder of the RFID tag system illustrated in FIG. 1.

Operationally, commands, data, etc., (hereinafter information) is transferred to the RFID tag device 110 over the transmission 108 from the transmitter 104 which is modulated by the PPM modulator 106. The information is applied to the PPM modulator 106 along with a clock source (not illustrated) that is part of the RFID tag reader 102. This information is received by the PPM modulation detector 114 of the RFID tag device 110, and is decoded by the PPM decoder 116. The PPM decoder 116 uses the internal oscillator 112 for timing functions in the PPM decoding process to produce the symbol data 118. The timing of the internal oscillator 112 must be calibrated with the PPM pulse timing or frequency detected so as to accurately decode the PPM information in the transmission 108. The PPM decoder 116 may be implemented as a state machine or in other ways known to those skilled in the art of digital logic circuits Referring to FIG. 1A, a more detailed schematic block diagram of the PPM decoder 116 in FIG. 1 is illustrated. The PPM decoder 116 comprises a synchronizer 120, a PPM decoder state machine 122, a calibration/reload function 124, a bit down counter 126, a bit window counter 128, and a symbol register 130. The synchronizer 120 receives the detected PPM signal from the PPM modulation detector 114. The PPM decoder 116 tracks the state of the transmission 108. On power up and during operation of the RFID tag device 110, the PPM decoder 116 expects the transmission of code violating calibration symbols (see FIG. 3). The internal oscillator 112 is used as a clock for the synchronizer 120, the PPM decoder state machine 122, the calibration/reload function 124, and the bit down counter 126. After decoding of the PPM symbol, the symbol data is available at the output of the symbol register 130. It is contemplated and within the scope of the present invention that the bit down counter 126 may also be an up-counter, a gray code counter and the like with equally effective results.

Figure 2:
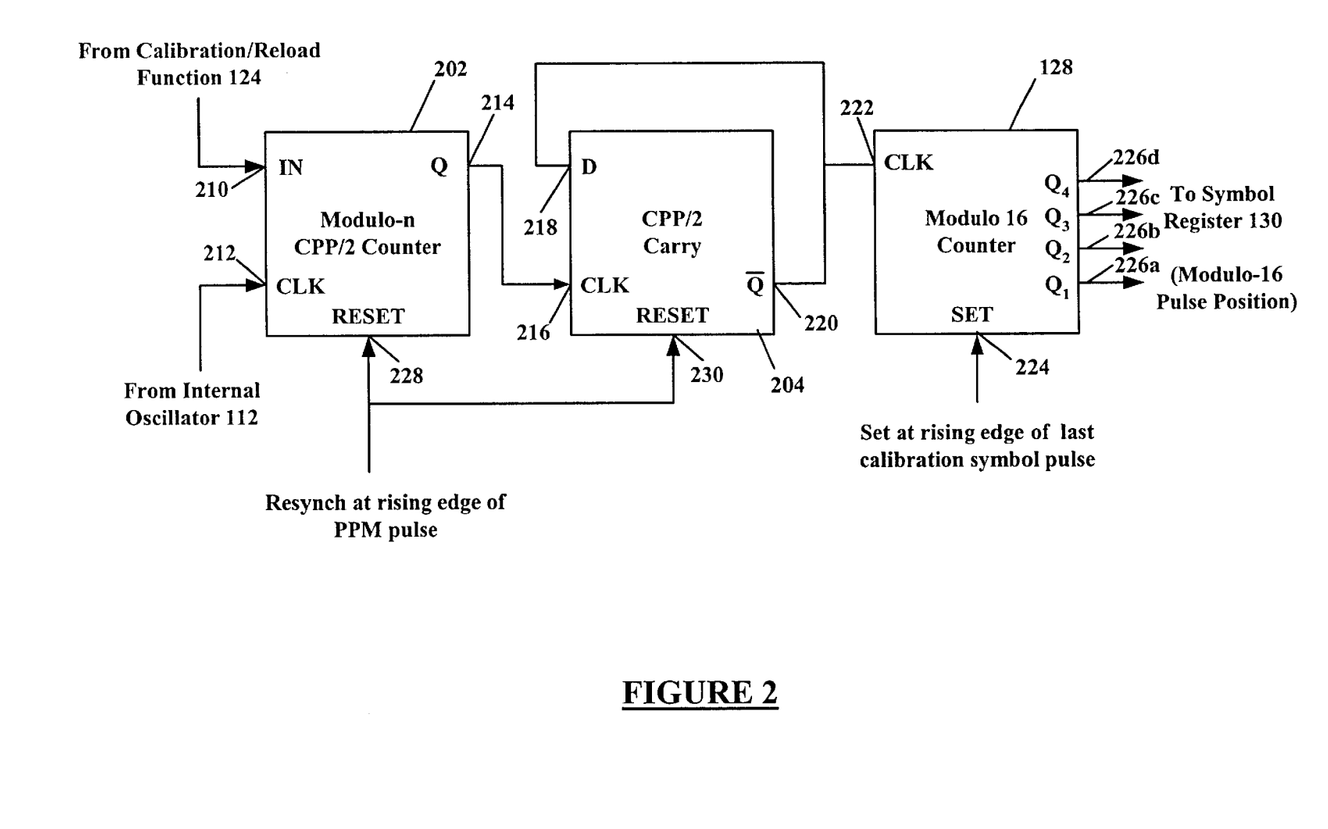
FIG. 2 is a more detailed schematic block diagram of a synchronization circuit according to the present invention.

Referring now to FIG. 2, a schematic block diagram of a synchronization circuit, according to an embodiment of the present invention, is illustrated. The bit down counter. 126 comprises a modulo-n CPP/2 counter 202 and a CPP/2 carry flipflop 204. The bit window counter 128 comprises a modulo-16 counter having a clock input 222, a set input 224 and outputs 226a-226d.

The modulo-n CPP/2 counter 202 is a multi-bit counter having a multi-bit input 210, a clock input 212, a Q output 214 and a reset input 228. The clock input 212 of the modulo-n CPP/2 counter 202 receives a clock signal from the internal oscillator 112. The internal oscillator 112 is at a higher frequency than the PPM pulse frequency. The internal oscillator 112 may be any integer multiple (n=2, 3, 4, 5, etc.) of the PPM pulse frequency. For illustration but not limitation, the internal oscillator may be four times the PPM pulse frequency, the modulo-n CPP/2 counter 202 may be a modulo-4 counter, and the output from the calibration/reload function 124 may be a two bit word which is loaded into the input 210.

The CPP/2 carry flipflop 204 may be a D-flipflop having a D input 218, a clock input 216, a not-Q output 220 and a reset input 230. The D input 218 is connected to the not-Q output 220 wherein the CPP/2 carry flipflop 204 will toggle each time a pulse is received at the clock input 216 from the Q output 214 of the modulo-n CPP/2 counter 202.

The modulo-n CPP/2 counter 202 and the CPP/2 carry flipflop 204 are reset (resynched) by a reset signal at the reset inputs 228 and 230, respectively. The reset signal is generated from the rising edge of each PPM pulse received from the PPM modulation detector 114.

The modulo-16 counter 128 (bit window counter 128) is a four bit counter having the clock input 222 connected to the not-Q output 220 of the modulo-n CPP/2 counter 202. The outputs, $Q_1$–$Q_4$, of the modulo-16 counter 128 represent the pulse position in the data symbol and are used to load the symbol register 130 which stores the decoded 1 of 16 PPM symbol data. It is contemplated and within the scope of the present invention that any number of pulse widths per symbol width and appropriate bit number p of a modulo-p counter 128 may be utilized.

A PPM pulse comprises a falling edge and a rising edge, wherein the falling edge occurs when the detected continuous wave (CW) carrier goes from a maximum signal level to a minimum signal level, and the rising edge occurs when the detected CW carrier goes from the minimum signal level back to the maximum signal level. The synchronization circuit illustrated in FIG. 2 uses the measured CPP from the calibration cycle for synchronizing to the 1 of 16 PPM data pulse for each data symbol. The modulo-n CPP/2 counter 202 counts off the two half periods of each PPM pulse. At each half period, the output 214 of the modulo-n CPP/2 counter 202 toggles the CPP/2 carry flip flop 204. The calibration/reload function 124 generates a reload value that will put the count value in the modulo-n CPP/2 counter 202 at about the midpoint of the PPM pulse relative to the frequency of the internal oscillator 112. The rising edge of the not-Q output 220 then clocks the modulo-16 counter 128 which tracks the pulse position count of the 1 of 16 PPM symbol. The modulo-16 counter 128 is preset by a set signal at the set input 224 which is generated from the last PPM pulse in the received calibration symbol.

Figure 3:
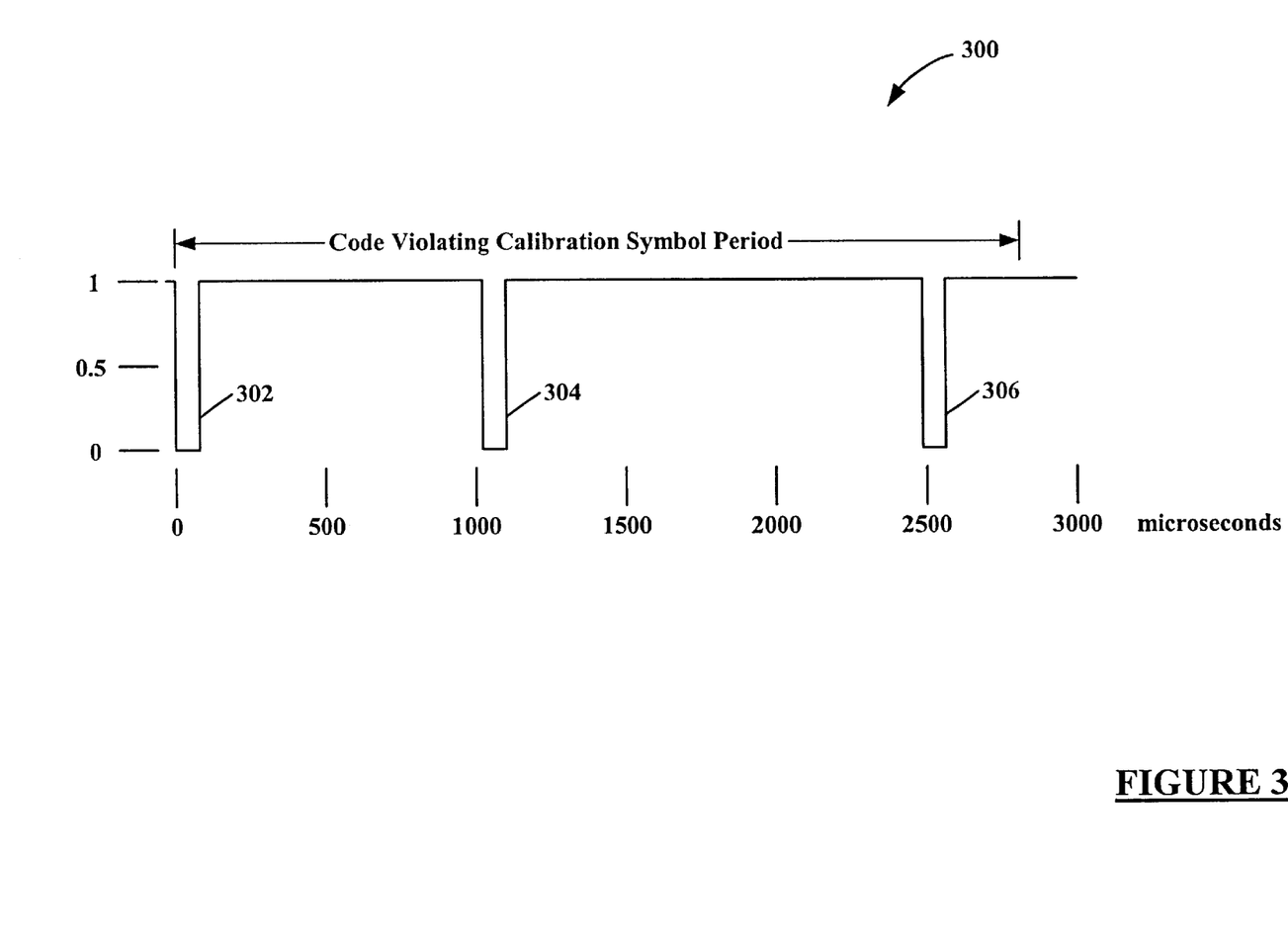
FIG. 3 is a schematic timing diagram of a code violating calibration symbol.

Referring now to FIG. 3, a schematic timing diagram of the format of the code violating calibration symbol is illustrated. The calibration symbol, generally indicated by the numeral 300, comprises three distinct PPM pulses transmitted within one symbol period. The symbol period comprises 16 time slots, and the three calibration pulses may be, for example but not limitation, at time slot position 0 for the first pulse 302, position 6 for the second pulse 304, and position 14 for the third pulse 306. Other number of time slots for a symbol period and number and positions for the calibration pulses may be used and are contemplated herein for the present invention. The time scale in FIG. 3 is for illustration only and other time scales may be utilized depending on the configurations of the invention.

Figure 3A:
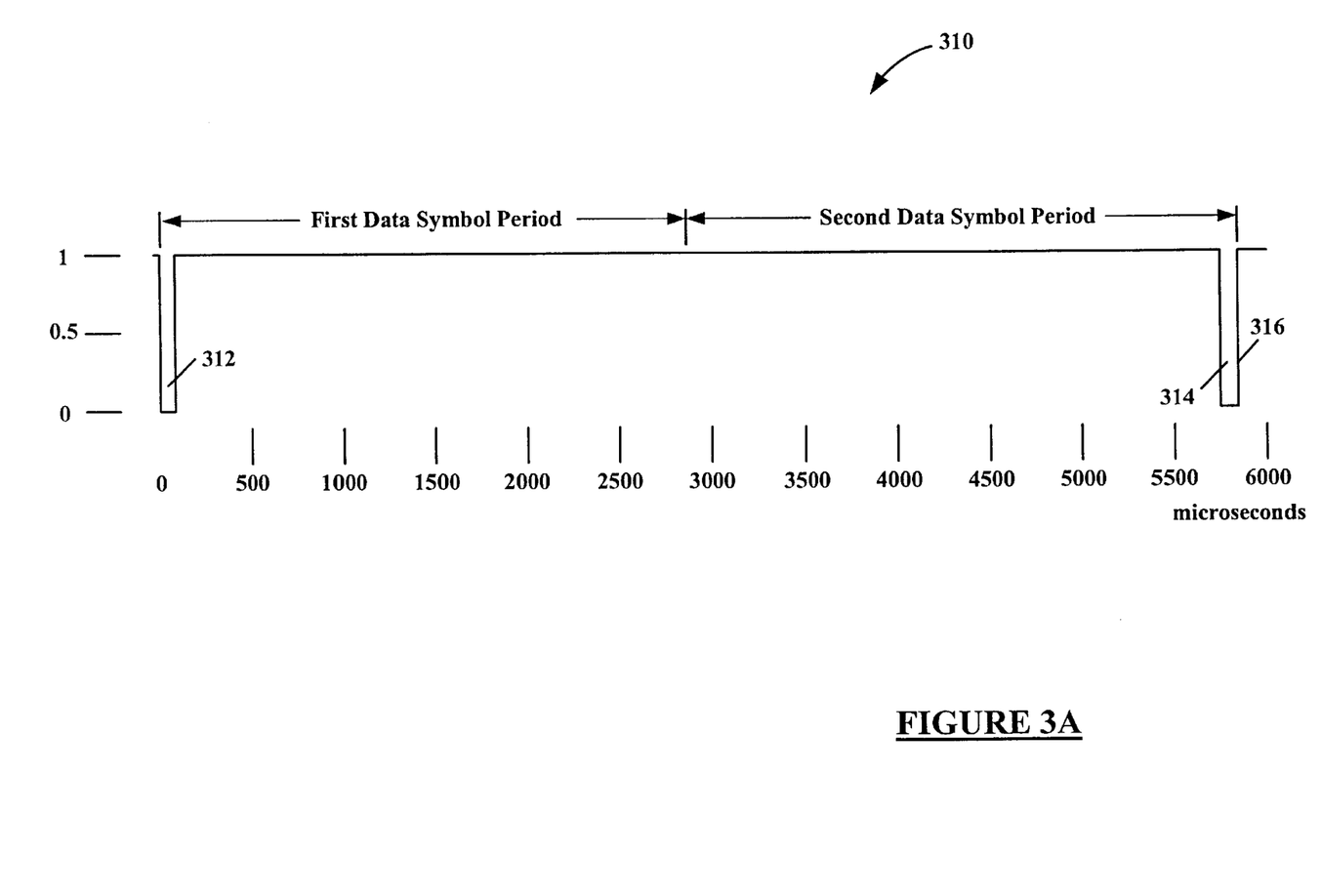
FIG. 3A is a schematic timing diagram of two consecutive data symbols.

Referring to FIG. 3A, a schematic timing diagram of two consecutive data symbols are illustrated. The first data symbol has a pulse 312 at time slot 0 (symbol "0") and the second data symbol has a pulse 314 at time slot 15 (symbol "$F_{16}$"). First data symbol 0 followed by second data symbol F represent a worst case scenario (maximum time separation between the two symbol pulses) for synchronizing the received PPM symbols and the internal oscillator 112. Pulses 312 and 314 are separated by 31 time slots (1 of 16 PPM). A PPM pulse is recognized on its rising edge as it exceeds a signal detection threshold. When the rising edge 316 of the pulse 314 occurs for a "fast" internal oscillator 112, the value at the outputs 226 of the modulo-16 counter 128 would be 15 ($F_{16}$) which is the correct answer. When the rising edge 316 of the pulse 314 occurs for a "slow" internal oscillator 112, the value at the outputs 226 of the modulo-16 counter 128 would be 14 ($E_{16}$) which is one count short. However, the CPP/2 carry flipflop 204 contains the corrective information if the pulse 314 is sampled in the following order.

1. At the rising edge of the PPM pulse, reset the modulo-n CCP/2 counter 202 and the CPP/2 carry flipflop 204;
   For a fast internal oscillator 112, not-$Q_{n-1}$=not-$Q_n$=1, which does
   not affect the modulo-16 counter 128;
   For a slow internal oscillator 112, not-$Q_{n-1}$=1, not-$Q_n$=0, thus incrementing the modulo-16 counter 128;
2. Sample the modulo-16 counter 128 for the received data symbol; and
3. Resynchronize to the next received PPM data symbol.

The invention, therefore, is well adapted to carry out the objects and attain the ends and advantages mentioned, as well as others inherent therein. While the invention has been depicted, described, and is defined by reference to particular preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An apparatus for initiating and maintaining synchronization of a pulse position modulation (PPM) decoder with a received PPM signal, comprising:
   a bit counter comprising a modulo-n counter having data inputs, a clock input, a reset input and a Q output, and a carry flip-flop having a data input, a clock input, a reset input and a Q-not output; and
   a bit window counter comprising a modulo-p counter having a clock input, a set input and a plurality of outputs; wherein
      the data inputs of the modulo-n counter are adapted to receive a reload value from a calibration/reload function,
      the clock input of the modulo-n counter is adapted to receive an internal oscillator clock signal,
      the Q output of the modulo-n counter is connected to the clock input of the carry flipflop,
      the Q-not output of the carry flipflop is connected to the data input of the carry flipflop and the clock input of the modulo-p counter,
   the reset inputs of the modulo-n counter and the carry flipflop are adapted to resynch the modulo-n counter and the carry flipflop at a rising edge of a PPM pulse, and
   the set input of the modulo-p counter is adapted to set the modulo-p counter at a rising edge of a last pulse of a calibration symbol.

2. The apparatus according to claim 1, wherein the bit window counter is a modulo-16 counter having a four bit output representing a pulse position in a PPM data symbol.

3. The apparatus according to claim 1, wherein the modulo-n counter counts off two half periods of the PPM pulse, and at each of the two half periods the Q output of the modulo-n counter toggles the carry flipflop.

4. The apparatus according to claim 1, wherein the reload value puts a count value into the modulo-n counter at about a midpoint of the PPM pulse relative to a frequency of an internal oscillator so that a rising edge of the not-Q output of the carry flipflop clocks the modulo-p counter which thereby tracks a pulse position count of a PPM data symbol.

5. The apparatus according to claim 4, wherein the modulo-p counter is a modulo 16 counter having a four bit output and the PPM data symbol is a 1 of 16 PPM data symbol.

6. The apparatus according to claim 1, wherein the internal oscillator is an integer multiple of the PPM pulse frequency.

7. The apparatus according to claim 1, wherein the bit counter is a down-counter.

8. The apparatus according to claim 1, wherein the bit counter is an up-counter.

9. The apparatus according to claim 1, wherein the bit counter is a gray code counter.

10. The apparatus according to claim 1, wherein the calibration symbol is represented by a calibration sequence of three pulses at symbol pulse positions 0, 6 and 14.

11. A pulse position modulation (PPM) decoder, comprising:
- a synchronizer adapted to receive a detected PPM modulation;
- a PPM decoder state machine connected to the synchronizer;
- a calibration-reload function connected to the PPM decoder state machine;
- an internal oscillator;
- a symbol register;
- a bit counter connected to the calibration reload function, the bit counter comprising a modulo-n counter having data inputs, a clock input, a reset input and a Q output, and a carry flipflop having a data input, a clock input, a reset input and a Q-not output;
- a bit window counter connected to the bit counter, the bit widow counter comprising a modulo-p counter having a clock input, a set input and a plurality of outputs; wherein
  - the data inputs of the modulo-n counter receives a reload value from the calibration/reload function,
  - the clock input of the modulo-n counter is connected to the internal oscillator,
  - the Q output of the modulo-n counter is connected to the clock input of the carry flipflop,
  - the Q-not output of the carry flipflop is connected to the data input of the carry flipflop and the clock input of the modulo-p counter,
  - the reset inputs of the modulo-n counter and the carry flipflop are adapted to resynch the modulo-n counter and the carry flipflop at a rising edge of a PPM pulse, and
  - the set input of the modulo-p counter is adapted to set the modulo-p counter at a rising edge of a last pulse of a calibration symbol; and
  - the internal oscillator is connected to the synchronizer, the PPM decoder state machine, the calibration-reload function and the bit counter.

12. The PPM decoder according to claim 11, wherein the internal oscillator frequency is an integer multiple of the PPM pulse frequency.

13. The PPM decoder according to claim 11, wherein the bit counter is a down-counter.

14. The PPM decoder according to claim 11, wherein the bit counter is an up-counter.

15. The PPM decoder according to claim 11, wherein the bit counter is a gray code counter.

16. The PPM decoder according to claim 11, wherein the calibration symbol is represented by a calibration sequence of three pulses at symbol pulse positions 0, 6 and 14.

17. The PPM decoder according to claim 11, further comprising an integrated circuit RFID tag device having the PPM decoder.

18. The PPM decoder according to claim 17, further comprising a radio frequency system having an RFID tag reader and the integrated circuit RFID tag device having the PPM decoder.

19. A method for initiating and maintaining synchronization of a pulse position modulation (PPM) decoder with a received PPM signal, said method comprising the steps of:
- resetting a modulo-n countermand a carry flipflop on a rising edge of a PPM pulse;
- loading a reload value into the modulo-n counter;
- clocking the modulo-n counter with an internal oscillator;
- clocking the carry flipflop with an output from the modulo-n counter wherein the carry flipflop output toggles for each clock pulse from the modulo-n counter;
- setting a modulo-p counter with a rising edge of a last pulse of a calibration symbol; and
- tracking a pulse position of a 1 of P PPM data symbol by clocking the modulo-p counter with an output of the carry flipflop.

20. The method of claim 19, wherein the step of resetting the modulo-n counter comprises the steps of:
- determining a first logic value of the carry flipflop output at a previous internal clock pulse and a second logic value of the carry flipflop output at a present internal clock pulse;
- if the first and second logic values are the same do nothing, and
- if the first and second logic values are different then increment a value in the modulo-p counter.

21. The method of claim 19, wherein the step of tracking the pulse position of the 1 of P PPM data symbol comprises the steps of:
- sampling the modulo-p counter for the pulse position of the received 1 of P PPM data symbol; and
- resynchronizing the modulo-p counter to the next received 1 of P PPM data symbol.

22. The method of claim 19, wherein P is 16 and the modulo-p counter is a modulo-16 counter.

23. The method of claim 19, wherein the calibration symbol is represented by a calibration sequence of three pulses at symbol pulse positions 0, 6 and 14.

* * * * *